United States Patent [19]

Samuelsson

[11] Patent Number: 4,551,968

[45] Date of Patent: Nov. 12, 1985

[54] METHOD AND APPARATUS FOR KILLING FIELD WEEDS

[76] Inventor: Bengt Å. Samuelsson, Torpa, 590 30 Borensberg, Sweden

[21] Appl. No.: 406,229

[22] PCT Filed: Nov. 20, 1981

[86] PCT No.: PCT/SE81/00338

§ 371 Date: Aug. 4, 1982

§ 102(e) Date: Aug. 4, 1982

[87] PCT Pub. No.: WO82/01977

PCT Pub. Date: Jun. 24, 1982

[30] Foreign Application Priority Data

Dec. 8, 1980 [SE] Sweden ............................. 8008603

[51] Int. Cl.$^4$ ..................................... A01D 75/18
[52] U.S. Cl. ................................... 56/16.4; 239/170; 239/172; 239/289
[58] Field of Search ................. 56/16.4, 16.8, 229; 239/170, 172, 289

[56] References Cited

U.S. PATENT DOCUMENTS

| | | | |
|---|---|---|---|
| 1,643,846 | 9/1927 | Hale | 239/289 |
| 2,048,063 | 7/1936 | Friedman | 239/170 |
| 2,740,248 | 4/1956 | Pickens . | |
| 3,021,642 | 2/1962 | Ewing . | |
| 3,257,753 | 6/1966 | Zennie . | |
| 3,301,487 | 1/1967 | Young | 239/170 |
| 3,645,073 | 2/1972 | Gomes et al. | 56/16.4 |
| 4,208,835 | 6/1980 | Roll et al. . | |
| 4,240,244 | 12/1980 | Martin | 56/16.4 |
| 4,242,855 | 1/1981 | Beaver | 56/16.8 |
| 4,252,274 | 2/1981 | Kubcak | 239/172 |

Primary Examiner—Gene Mancene
Assistant Examiner—Wenceslao J. Contreras
Attorney, Agent, or Firm—Fleit, Jacobson, Cohn & Price

[57] ABSTRACT

Method and apparatus for applying a weed killer to selected areas of a harvested crop in combination with the harvester employed to do the said harvesting.

3 Claims, 2 Drawing Figures

METHOD AND APPARATUS FOR KILLING FIELD WEEDS

The present invention relates to a method of killing weeds on fields, especially root weeds such as couch. Such weeds have a growth-height of only some centimeters and it grows spotwise on the fields. According to the prior art the killing of weeds is carried out by means of chemicals which, prior to use, are dissolved in a liquid, usually water, and then sprayed over the area to be treated.

Spraying of field weeds is usually effected by means of tractor-drawn tank trucks which are equipped with long tubes or ramps with spray nozzles. The ramps may be up to 20 m wide or more. As the wheels of the tank truck has a relatively small track gauge, about 2 m, the ramps will sway heavily up and down during driving on a rough field. In order not to touch the ground they must be placed in a relatively high position above the ground. This makes the spraying uneven and less efficient.

Another disadvantage is that all the spray nozzles in the ramp must be engaged at the same time for spraying even if the weeds to be killed comprise only a minor portion of the width covered and sprayed by the ramp. This is most uneconomical, especially because chemicals are expensive. From an environmental point of view it is also unsatisfactory to spread chemicals more than necessary.

Still another disadvantage appears when it is windy. Due to the high position of the spray nozzles the wind carries away spray liquid from the intended area which thus will not receive the amount intended for efficient killing. Liquid may also be carried along with the wind to areas which are to be protected against spraying, e.g. fruit and vegetable plantations adjoining the fields.

Spraying of weeds takes place in autumn when the crop, e.g. corn or pea plants, is harvested from the fields and when crop residues, such as e.g. straw, have been removed from the ground. The crop residues must be removed in order not to hinder the killer from attaining full efficiency. There is still another reason to carry out the killing in the autumn, viz. at that time the ground has a soil dampness that is favourable to killing operations.

As is apparent from the above description the killing of field weeds takes place after the harvest work is over and preferably after any crop residues left have been removed from the ground. Thus, harvest work and weed killing are carried out at two different times, which involves heavy costs and much work.

The object of the invention is to overcome the disadvantages described above and to provide a method of weed killing which is economically advantageous, saves time and can be carried out with great precision and efficiency. The invention also relates to an apparatus for carrying out the method.

The object of the invented method of killing weeds by chemicals is achieved by carrying out the killing in connection with the harvest work and by applying killers to the field weeds by an applicator means immediately after the crop has been harvested and lifted from the field but before any crop residues left, such as straw, are redeposited on the field.

It is advantageous to use concentrated or slightly diluted killer and to allow the applicator means to coat the above-ground portions of the weed with the killing liquid and to carry out the killing by an applicator means placed between the harvesting table of a harvester and its ejector, if any, for crop residues, said applicator means being disposed transversely of the driving direction and having at least the same width as the harvester.

Other advantages are achieved by dividing the applicator means into several sections along its length and to set one or more sections in operation selectively in order to kill only in those areas where weeds occur.

An advantageous and convenient embodiment is realized by arranging the applicator means so as to be engageable and disengageable by means of controls positioned at the driver's seat.

The invention will be described in more detail hereinafter with reference to the drawing, in which.

Figure 1:
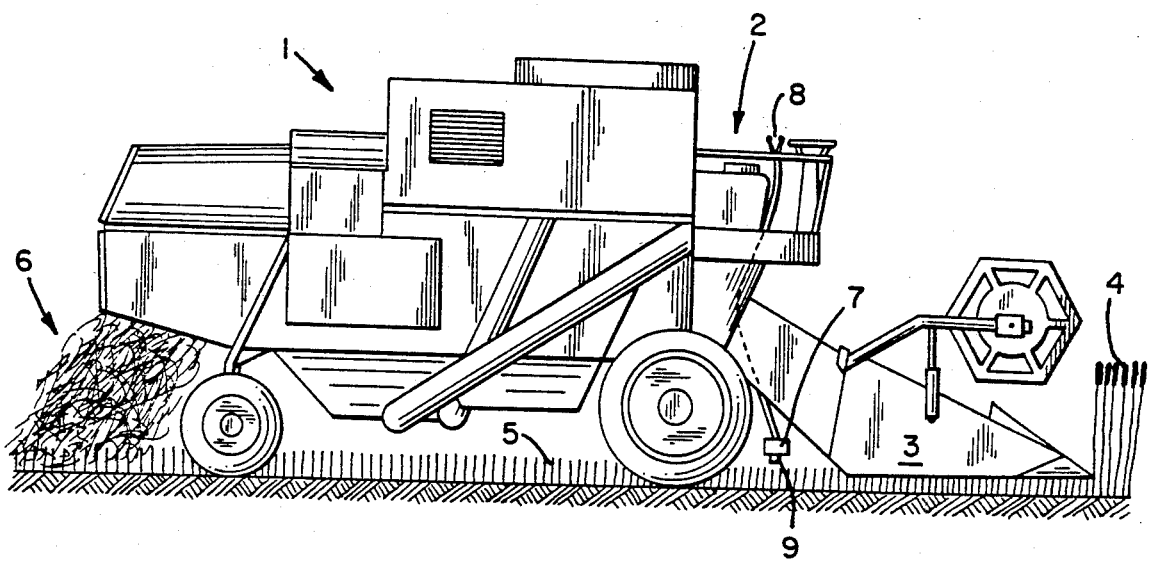
FIG. 1 is a side view of a harvester, a combine harvester.

In FIG. 1 the machine, designated in its entirety by 1, is steered and operated from a driver's seat 2 on the top of the front of the machine. The machine, chosen by way of example, is a combine harvester for corn. At the front end it has a harvesting table 3 at the front edge of which reciprocating knives are arranged for cutting off the crop 4. On the field there is left a short stubble 5 while the greater portion of the corn straw with ear is introduced into the harvester where it is threshed. During threshing the corn grains are separated, and crop residues, primarily straw 6, are ejected at the rear part of the machine and settle as a layer on the ground behind the machine.

According to the invention the harvester has, behind the harvesting table 3 but ahead of the ejected crop residues 6, an applicator or coating means 7 for application of the killer to the weeds. From the high-positioned driver's seat 2 the driver has an excellent view and notices very easily where weeds occur. When the driver discovers weeds he can easily set the applicator means in operation by means of controls 8 at the driver's seat 2 in order to apply the chemical killer to the weeds. In the example shown the applicator means consists of a tube with nozzles 9 through which liquid is sprayed from a tank (not shown) for killer.

By means of the apparatus described killer is applied only where the driver discovers weeds and the apparatus therefore need not be in operation all the time. This saves expensive killer and it thus means good economy. This may be further improved by a development of the invention, as appears from FIG. 2.

Figure 2:
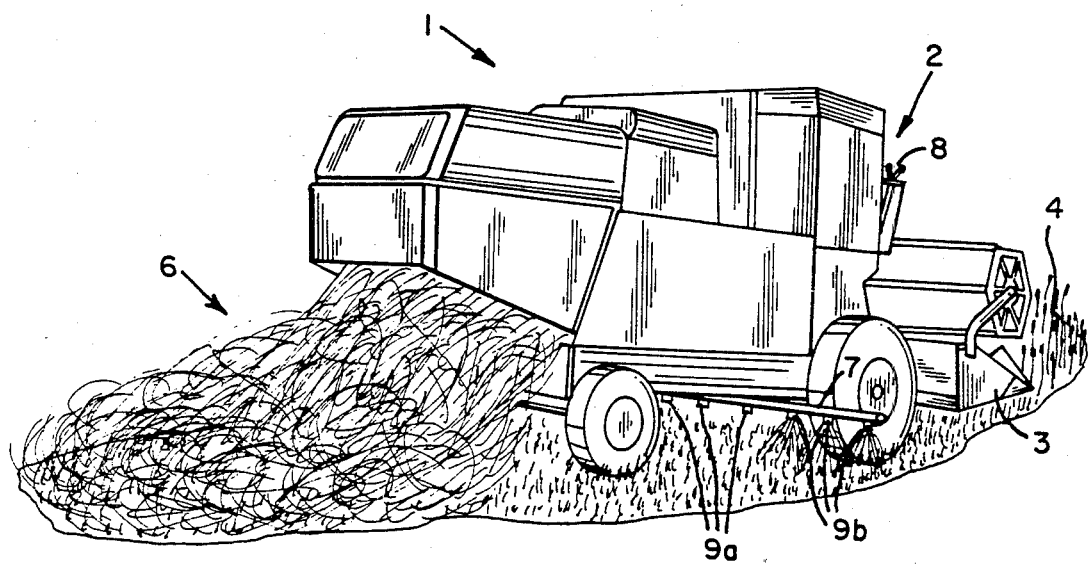
FIG. 2 is a diagonal end view of the same machine.

In FIG. 2 the reference numerals are identical with those of FIG. 1, but the figure shows the applicator means in another position. In FIG. 2 said means is placed behind the front wheels instead of being placed ahead of them as in FIG. 1. This position is chosen to illustrate more clearly said further development of the invention. In the same way as the weeds grow intermittently in the driving direction they also grow intermittently in the transverse direction. The applicator means therefore is divided into sections which can be engaged selectively by means of the controls 8 at the driver's seat 2. Thus, as appears from FIG. 2, the three outermost nozzles 9b are in operation, while the nozzles 9a situated immediately inside thereof are not engaged.

Accordingly, by engaging sections sidewise for spots where weeds grow, which the driver can easily notice from his seat, it is possible for him, to select the section or sections required to cover solely the appropriate spots during driving. This results in a maximum of efficiency and a minimum of costs for weed killing. Contributory to this is the fact that the width covered transversely by the harvester is much smaller than in killing weeds by means of tank waggons with wide ramps where the driver is seated in a low position and besides it is difficult for him to watch the ground farthest away below the ramp. He will also have to be more concentratedly observant since he covers a large area per unit of time and is more liable to overlook the occurrence of weeds, in the aforementioned prior art method of killing weeds.

The method and apparatus described is also applicable to harvesting of feeding-peas and other crops. The applicator means may be modified in many various ways without departing from the inventive idea as this is defined in the appended claims.

I claim:

1. A method of killing field weeds such as root weeds, couch and the like, by means of liquid weed killer during harvesting of crops by means of a self-propelled motor-driven harvester combine having a front cutting device for loading the crop onto a conveyor for carrying the crop upwards to a threshing apparatus and ejecting the threshing residues onto the field rearwardly of the threshing apparatus, said method comprising the steps of: cutting the crop plants to leave a short plant stubble in the crop field; threshing the cut crop to separate it into a crop and a crop residue; selectively applying said liquid weed killer to the cut crop field from said harvester combine weed killer distribution apparatus both intermittently longitudinally of the direction of travel of the harvester combine as well as simultaneously selectively applying said liquid weed killer intermittently transversely of the direction of travel of the harvester combine to apply said liquid weed killer only over areas of the crop field where weeds are found, the application of liquid weed killer occurring after harvesting the crop but before depositing crop residue onto the crop field by applying the liquid weed killer to the above-ground portions of the weeds; and thereafter depositing crop residue onto the field from the harvester combine.

2. A method as claimed in claim 1, wherein said selective application step includes selectively spraying the liquid weed killer onto the cut crop field.

3. Apparatus for killing field weeds such as root weeds, couch and the like, by means of liquid weed killer during harvesting of crops, said apparatus comprising:

a self-propelled, motor-driven harvester combine having a front cutting device, means for loading the crop onto a conveyor for carrying the crop upwardly to a threshing apparatus, and means for ejecting the threshing residues onto the field rearwardly of the threshing apparatus through a crop residue ejecting opening, and liquid weed killer storage means; and an elongated liquid weed killer applicator means arranged transversely of the direction of travel of the harvester combine and extending across at least the width of the harvester combine and in communication with said liquid weed killer storage means, said applicator means including a tubular distribution member divided into at least two sections each having discharge nozzles, said distribution member positioned between said front cutting device and said crop residue ejection opening, said tubular sections each extending transversely of the direction of travel of the harvester combine, and control means for selectively engaging and disengaging the applicator means from the liquid weed killer storage means, said control means selectively and intermittently operable to cause liquid weed killer to spray through desired discharge nozzles prior to deposit of crop residue onto the crop field in order to apply to the cut area the liquid weed killer in a check pattern depending on the occurrence of weeds.

* * * * *